United States Patent
Cai et al.

(10) Patent No.: US 10,505,261 B2
(45) Date of Patent: Dec. 10, 2019

(54) SENSING SCREEN, CONTROL CIRCUIT AND CONTROL METHOD THEREOF, AND SENSING SCREEN APPARATUS

(71) Applicant: HUAWEI TECHNOLOGIES CO., LTD., Shenzhen, Guangdong (CN)

(72) Inventors: Hua Cai, Chengdu (CN); Chang Cao, Chengdu (CN); Jingtao Chen, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 25 days.

(21) Appl. No.: 15/374,072

(22) Filed: Dec. 9, 2016

(65) Prior Publication Data

US 2017/0093023 A1    Mar. 30, 2017

Related U.S. Application Data

(63) Continuation of application No. PCT/CN2014/079647, filed on Jun. 11, 2014.

(51) Int. Cl.
*G06F 3/041*   (2006.01)
*H01Q 1/24*    (2006.01)
(Continued)

(52) U.S. Cl.
CPC ............ *H01Q 1/243* (2013.01); *G06F 3/041* (2013.01); *G06F 3/0416* (2013.01); *H01Q 1/22* (2013.01);
(Continued)

(58) Field of Classification Search
CPC ............ H01Q 1/22; H01Q 1/243; H01Q 1/38; H01Q 21/24; H01Q 3/24; G06F 3/0416;
(Continued)

(56) References Cited

U.S. PATENT DOCUMENTS 7,983,721 B2 *   7/2011   Ying ................... H01Q 1/1271
                                                    343/702
2009/0305742 A1   12/2009   Caballero et al.
(Continued)

FOREIGN PATENT DOCUMENTS

CN    201438247 U    4/2010
CN    102063238 A    5/2011
(Continued)

*Primary Examiner* — Jason M Mandeville
(74) *Attorney, Agent, or Firm* — Leydig, Voit & Mayer, Ltd.

(57) ABSTRACT

The present application discloses a sensing screen, a control circuit and control method thereof, and a sensing screen apparatus. The sensing screen includes a display screen, a first transparent medium layer, a transparent connection layer, and an antenna layer. The antenna layer includes multiple antenna units, and the antenna units include at least one first antenna unit and multiple second antenna units. The first antenna unit is configured to transmit a sensing signal, the second antenna units are configured to receive reflected signals of the sensing signal, and the reflected signals are generated by a touch object by reflecting the sensing signal. According to the present application, the antenna layer is arranged right above the display screen, so that a touch area of the sensing screen is fully utilized while screen display is not affected, so as to substantially increase an antenna size and increase an antenna gain.

15 Claims, 9 Drawing Sheets

(51) Int. Cl.
*H01Q 1/22* (2006.01)
*H01Q 1/38* (2006.01)
*H01Q 3/24* (2006.01)
*H01Q 21/24* (2006.01)

(52) U.S. Cl.
CPC ............... *H01Q 1/38* (2013.01); *H01Q 3/24* (2013.01); *H01Q 21/24* (2013.01); *G06F 2203/04107* (2013.01)

(58) Field of Classification Search
CPC ........ G06F 3/041; G06F 3/0412; G06F 3/046; G06F 2203/04101; G06F 2203/04107; G06F 2203/04108
USPC .......................................................... 345/173
See application file for complete search history.

(56) References Cited

U.S. PATENT DOCUMENTS

| | | |
|---|---|---|
| 2010/0297952 A1 | 11/2010 | Rofougaran |
| 2010/0321325 A1 | 12/2010 | Springer et al. |
| 2011/0248934 A1 | 10/2011 | Yeh et al. |
| 2012/0092284 A1 | 4/2012 | Rofougaran et al. |
| 2012/0162128 A1 | 6/2012 | Hyoung et al. |
| 2012/0229417 A1 | 9/2012 | Badaye |
| 2012/0299841 A1 | 11/2012 | Tang et al. |
| 2013/0082925 A1 | 4/2013 | Sato |
| 2013/0229362 A1 | 9/2013 | Liu et al. |
| 2013/0328732 A1 | 12/2013 | Shimizu |
| 2014/0071070 A1 | 3/2014 | Xiang et al. |
| 2014/0104157 A1* | 4/2014 | Burns .................. H01Q 1/243 345/156 |
| 2014/0106684 A1* | 4/2014 | Burns .................. H01Q 1/243 455/78 |
| 2014/0118308 A1* | 5/2014 | Rhee .................. G06F 3/0383 345/177 |

FOREIGN PATENT DOCUMENTS

| | | |
|---|---|---|
| CN | 102129324 A | 7/2011 |
| CN | 202259676 U | 5/2012 |
| CN | 103076911 A | 5/2013 |
| CN | 103294247 A | 9/2013 |
| CN | 103367865 A | 10/2013 |
| EP | 2587347 A2 | 5/2013 |
| EP | 2703964 A1 | 3/2014 |
| JP | 2003280815 A | 10/2003 |
| JP | 2011526099 A | 9/2011 |
| JP | 2011248694 A | 12/2011 |
| JP | 2013077271 A | 4/2013 |
| KR | 20090123647 A | 12/2009 |
| KR | 20110113547 A | 10/2011 |
| KR | 20130045222 A | 5/2013 |
| KR | 20130095451 A | 8/2013 |
| KR | 20140008292 A | 1/2014 |
| TW | 201135546 A | 10/2011 |
| WO | 2012034715 A1 | 3/2012 |
| WO | 2012050069 A1 | 4/2012 |
| WO | 2014061239 A1 | 4/2014 |

\* cited by examiner

SENSING SCREEN, CONTROL CIRCUIT AND CONTROL METHOD THEREOF, AND SENSING SCREEN APPARATUS

CROSS-REFERENCE TO RELATED APPLICATIONS

This application is a continuation of International Application No. PCT/CN2014/079647, filed on Jun. 11, 2014, the disclosure of which is hereby incorporated by reference in its entirety.

TECHNICAL FIELD

The present application relates to the field of wireless communications, and in particular, to a sensing screen, a control circuit and control method thereof, and a sensing screen apparatus.

BACKGROUND

With the development of wireless communications technologies, emerging application scenarios and demands constantly come into being in large numbers, and radio access networks also develop towards large capacities, millimeter waves, multiple bands, and the like. An antenna of a conventional mobile terminal or portable device based on low-frequency communications technologies can implement omnidirectional coverage, and a gain of the antenna is usually about 2 dBi. However, for a mobile terminal or portable device based on high-frequency communications technologies, because a transmission loss of the high-frequency communications technologies is relatively large, in order to meet requirements of communication within a distance, an antenna size needs to be increased to increase an antenna gain. It is estimated that an antenna gain of a mobile terminal or portable device needs to reach greater than 10 dBi in a millimeter-wave application, and the antenna gain even needs to reach 25-30 dBi in some application scenarios.

In the prior art, a mobile terminal or portable device that has a touch display function is provided. The mobile terminal or portable device is based on conventional low-frequency communications technologies and includes a touch display screen, a touchscreen sensing unit, a light emitting part, an antenna, and a transparent conductive material. The touch display screen, the touchscreen sensing unit, and the light emitting part jointly occupy a touchscreen area of the mobile terminal or portable device. The transparent conductive material is placed in a part of the touchscreen area. The antenna is mainly placed in a non-touch-screen area, and a part of the antenna is placed around the transparent conductive material.

During implementation of the present application, the inventor finds that the prior art has at least the following problems:

A conventional mobile terminal or portable device has a relatively low requirement on an antenna gain, an antenna and a touch display screen can be arranged in different locations of the mobile terminal or portable device, and arrangement requirements of the touch display screen and the antenna can be completely met. However, in a millimeter-wave wireless communications system that uses high-frequency communications technologies, the millimeter-wave wireless communications system has a significantly increased requirement on the antenna gain, and therefore an antenna size (or a physical aperture) increases. Moreover, due to a consideration on a visual effect, if a size of the mobile terminal or portable device is limited, a size of the touch display screen of the mobile terminal or portable device becomes increasingly large, an area available for the antenna becomes increasingly small, and a touchscreen area of the mobile terminal or portable device cannot be efficiently utilized.

SUMMARY

In order to resolve the foregoing problems in the prior art, embodiments of the present application provide a sensing screen, a control circuit and control method thereof, and a sensing screen apparatus. The technical solutions are as follows:

According to a first aspect, an embodiment of the present application provides a sensing screen, where the sensing screen includes a display screen, a first transparent medium layer, a transparent connection layer, and a transparent antenna layer, where the first transparent medium layer is sandwiched between the connection layer and the antenna layer, and the connection layer is sandwiched between the first transparent medium layer and the display screen; and the antenna layer includes multiple antenna units, and the multiple antenna units include at least one first antenna unit and multiple second antenna units, where the first antenna unit is configured to transmit a sensing signal, and the second antenna units are configured to receive reflected signals of the sensing signal, where the reflected signals are generated by a touch object by reflecting the sensing signal, or the first antenna unit and the second antenna units are configured to simultaneously transmit or receive a communication signal, and the multiple second antenna units are interspersed with the first antenna unit.

According to a second aspect, an embodiment of the present application provides a control circuit of a sensing screen, configured to control the sensing screen according to the first aspect, where the control circuit includes an adjustment module and a control module, the adjustment module is controlled by the control module to adjust a sensing signal, reflected signals, and a communication signal, the control module is further configured to determine a location of a touch object according to the adjusted sensing signal and reflected signals, and the adjustment module is electrically connected to the sensing screen and the control module separately.

According to a third aspect, an embodiment of the present application provides a sensing screen apparatus, where the sensing screen apparatus includes the sensing screen according to the first aspect and a control apparatus, where the control apparatus includes a housing and the control circuit according to the second aspect, the control circuit is disposed in the housing, and the control circuit is connected to the sensing screen by using the housing.

Application

The technical solutions provided by the embodiments of the present application have the following beneficial effects:

An antenna layer made of a transparent material, a transparent connection layer, a first transparent medium layer, and a display screen are used to make a sensing screen, and the antenna layer is arranged right above the display screen, so that a touch area of the sensing screen is fully utilized while screen display is not affected, so as to substantially increase an antenna size and increase an antenna gain. In addition, a first antenna unit transmits a sensing signal, second antenna units receive reflected signals of the sensing signal, and a location corresponding to a touch object is determined according to the reflected signals, so as to implement a sensing function without adding extra costs, thereby reducing costs and achieving use convenience.

BRIEF DESCRIPTION OF DRAWINGS

To describe the technical solutions in the embodiments of the present application more clearly, the following briefly describes the accompanying drawings required for describing the embodiments. Apparently, the accompanying drawings in the following description show merely some embodiments of the present application, and a person of ordinary skill in the art may still derive other drawings from these accompanying drawings without creative efforts.

DESCRIPTION OF EMBODIMENTS

To make the objectives, technical solutions, and advantages of the present application clearer, the following further describes the embodiments of the present application in detail with reference to the accompanying drawings.

Embodiment 1

Figure 1:
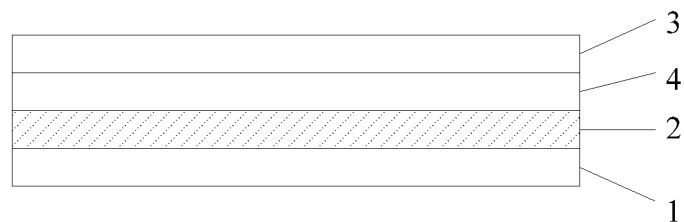
FIG. 1 is a schematic structural diagram of a sensing screen according to Embodiment 1 of the present application.
Figure 1A:
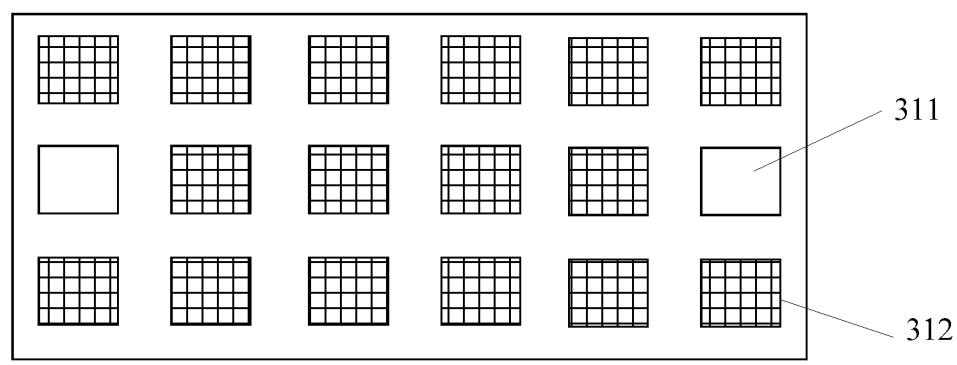
FIG. 1a is a schematic structural diagram of an antenna layer according to Embodiment 1 of the present application.

This embodiment of the present application provides a sensing screen. Referring to FIG. 1 and FIG. 1a, the sensing screen includes a display screen 1, a connection layer 2, a transparent antenna layer 3, and a first transparent medium layer 4. The first transparent medium layer 4 is sandwiched between the connection layer 2 and the antenna layer 3, and the connection layer 2 is sandwiched between the first transparent medium layer 4 and the display screen 1. The antenna layer 3 includes multiple antenna units 31, and the multiple antenna units 31 include at least one first antenna unit 311 and multiple second antenna units 312. An antenna of the first antenna unit 311 is configured to transmit a sensing signal, and antennas of the second antenna units 312 are configured to receive reflected signals of the sensing signal, where the reflected signals are generated by a touch object by reflecting the sensing signal. Alternatively, the first antenna unit 311 and the second antenna units 312 are all configured to simultaneously transmit or receive a communication signal. The multiple second antenna units 312 are interspersed with the first antenna unit 311.

When the first antenna unit 311 and the second antenna units 312 are configured to generate a communication signal, for example, when a mobile phone to which the sensing screen is applied is on a call, the first antenna unit 311 may be construed as the second antenna unit 312. When the antenna of the first antenna unit 311 is configured to transmit a sensing signal, and the antennas of the second antenna units 312 are configured to receive reflected signals of the sensing signal, the sensing screen may be used as a non-contact display screen of a terminal.

According to this embodiment of the present application, an antenna layer made of a transparent material, a transparent connection layer, a first transparent medium layer, and a display screen are used to make a sensing screen, and the antenna layer is arranged right above the display screen, so that a touch area of the sensing screen is fully utilized while screen display is not affected, so as to substantially increase an antenna size and increase an antenna gain. In addition, a first antenna unit transmits a sensing signal, second antenna units receive reflected signals of the sensing signal, and a location corresponding to a touch object is determined according to the reflected signals, so as to implement a sensing function without adding extra costs, thereby reducing costs and achieving use convenience.

Embodiment 2

Figure 2:
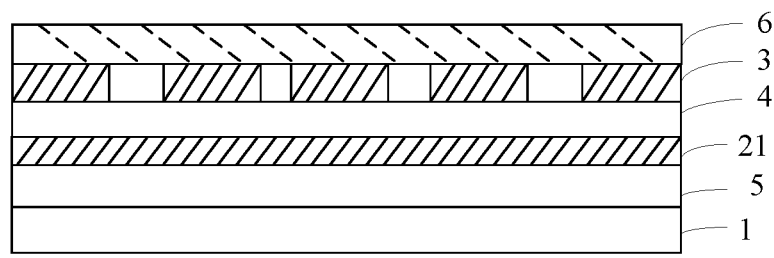
FIG. 2 is a schematic structural diagram of a sensing screen according to Embodiment 2 of the present application.

This embodiment of the present application provides a sensing screen. Referring to FIG. 2, the sensing screen includes a display screen 1, a transparent connection layer 2, a transparent antenna layer 3, and a first transparent medium layer 4. The first transparent medium layer 4 is sandwiched between the connection layer 2 and the antenna layer 3, and the connection layer 2 is sandwiched between the first transparent medium layer 4 and the display screen 1. The antenna layer 3 includes multiple antenna units 31, and the multiple antenna units 31 include at least one first antenna unit 311 and multiple second antenna units 312. An antenna of the first antenna unit 311 is configured to transmit a sensing signal, and antennas of the second antenna units 312 are configured to receive reflected signals of the sensing signal, where the reflected signals are generated by a touch object by reflecting the sensing signal. Alternatively, the first antenna unit 311 and the second antenna units 312 are configured to simultaneously transmit or receive a communication signal. The multiple second antenna units 312 are interspersed with the first antenna unit 311.

The display screen 1 may use either an LED (Light Emitting Diode) display screen or an LCD (Liquid Crystal Display).

The first transparent medium layer 4 is configured to transmit the sensing signal, the reflected signals, and the communication signal. The first transparent medium layer 4 may use transparent glass or air. When the first transparent medium layer 4 uses air, a medium structure is further needed for supporting.

In this embodiment, the connection layer 2 includes a shield layer 21 and a ground layer 22 (not shown in the figure). The shield layer 21 is configured to shield the antenna layer 3 and return the communication signal, the sensing signal, and the reflected signals. The ground layer 22 is configured to ground the antenna layer 3. The ground layer 22 may be a protrusion disposed on the shield layer 21, and the protrusion may be soldered on a circuit board, so as to implement a grounding function. During implementation, the shield layer 21 and the ground layer 22 may be made of materials such as ITO (Indium Tin Oxide).

In another implementation manner, the shield layer 21 and the ground layer 22 may also be integrated into one layer.

During implementation, the antenna layer 3 includes multiple antenna feeders 32 that feed the antenna units 31. Referring to FIG. 2b and FIG. 2c, the antenna units 31 are arranged uniformly, and each antenna feeder 32 is connected to one antenna unit 31. Alternatively, each antenna feeder 32 is connected to multiple antenna units 31, and different antenna feeders 32 are connected to different antenna units 31.

Figure 2A:
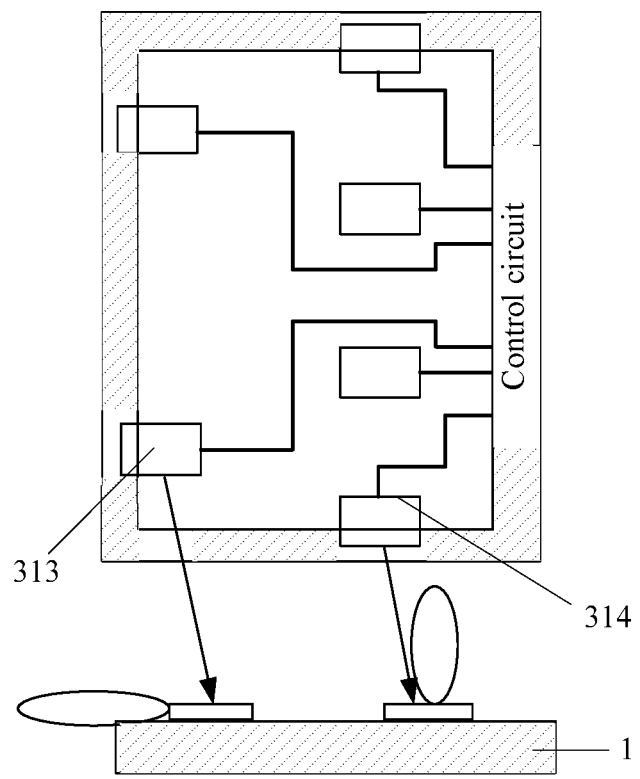
FIG. 2a is a schematic diagram of a uniform antenna array arrangement manner according to Embodiment 2 of the present application.
Figure 2B:
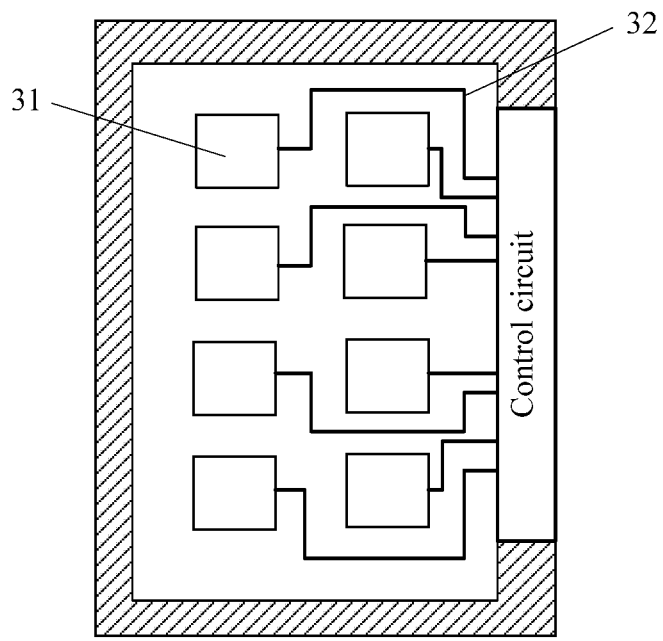
FIG. 2b is a schematic diagram of a non-uniform antenna array arrangement manner according to Embodiment 2 of the present application.
Figure 2C:
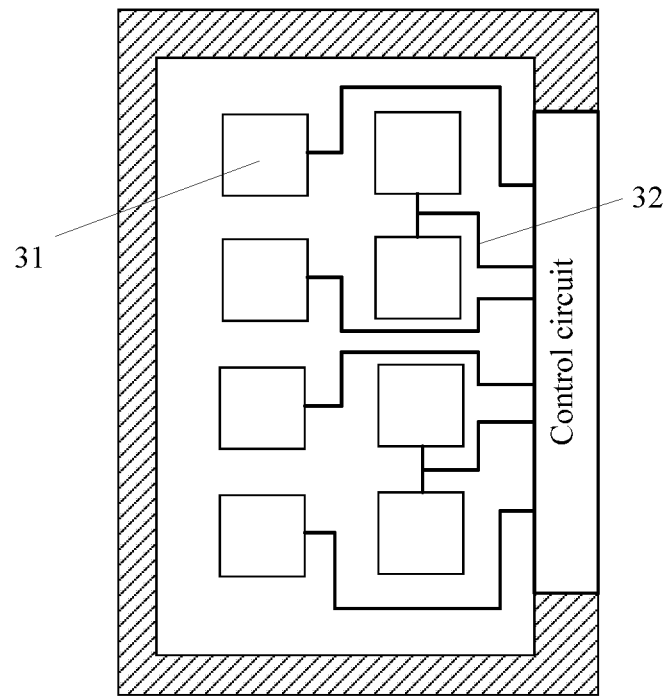
FIG. 2c is a schematic diagram of a radiation direction of an antenna according to Embodiment 2 of the present application.
Figure 3:
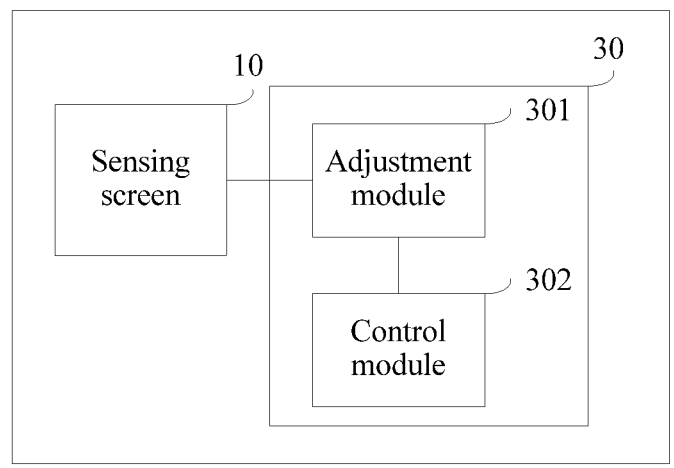
FIG. 3 is a schematic structural diagram of a control circuit according to Embodiment 3 of the present application.

In this embodiment, referring to FIG. 2a, all the antenna units 31 form an antenna array, a radiation direction of an array formed by some antenna units, that is, antenna units 313, of the antenna array is parallel with the display screen 1, and a radiation direction of an array formed by the other antenna units, that is, antenna units 314, of the antenna array is perpendicular to the display screen 1. During implementation, amplitude and a phase of a signal in each antenna unit may be adjusted to change a beam direction of the antenna array within a certain range, so as to form a radiation pattern (or an antenna directivity pattern) that is of the antenna array and that covers the entire display screen. It can be easily understood that, the radiation direction of the array formed by the antenna units is affected by a type of the antenna units, a manner of connection between the antenna feeders and the antenna units, and a phase and amplitude of a signal generated in the antenna units.

The antenna units are made of one or more of ITO, FTO (Fluorine-doped Tin Oxide), ZnO:Al (Aluminum-doped Zinc Oxide), and ZnO:In (Indium-doped Zinc Oxide). During implementation, the antenna units may be low-profile antennas. The low-profile antennas may include one or more of a patch antenna, a slot antenna, a Vivaldi antenna, and a low-profile high-gain vertically polarized omnidirectional antenna.

It should be noted that, in an actual application, in order to bring convenience for manufacturing of the sensing screen and subsequent control processing, usually all the second antenna units use a same type of low-profile antennas, for example, patch antennas, and all the first antenna units use a same type of low-profile antennas, and the first antenna unit may be the same as or different from the second antenna units in type.

In this embodiment, the sensing screen further includes a second transparent medium layer 5 disposed between the display screen 1 and the connection layer 2, where the second transparent medium layer 5 may also use transparent glass or air. When the second transparent medium layer 5 uses air, a medium structure is further needed for supporting.

In this embodiment, the sensing screen may further include a transparent protective layer 6 that overlies the antenna layer 3, and the transparent protective layer 6 and the first transparent medium layer 4 are located on two sides of the antenna layer 3. During implementation, the transparent protective layer 6 is a thin layer formed by a transparent medium with a relatively low dielectric constant.

According to this embodiment of the present application, an antenna layer made of a transparent material, a transparent connection layer, a first transparent medium layer, and a display screen are used to make a sensing screen, and the antenna layer is arranged right above the display screen, so that a touch area of the sensing screen is fully utilized while screen display is not affected, so as to substantially increase an antenna size and increase an antenna gain. In addition, a first antenna unit transmits a sensing signal, second antenna units receive reflected signals of the sensing signal, and a location corresponding to a touch object is determined according to the reflected signals, so as to implement a sensing function without adding extra costs, thereby reducing costs and achieving use convenience.

Embodiment 3

This embodiment of the present application provides a control circuit of a sensing screen. The control circuit 30 is configured to control the sensing screens corresponding to Embodiment 1 and Embodiment 2. The control circuit 30 includes an adjustment module 301 and a control module 302. The adjustment module 301 is controlled by the control module 302 to adjust a sensing signal, reflected signals, and a communication signal. The control module 302 is further configured to determine a location of a touch object according to the adjusted sensing signal and reflected signals. The adjustment module 301 is electrically connected to the sensing screen 10 and the control module 302 separately.

According to this embodiment of the present application, an antenna layer made of a transparent material, a transparent connection layer, a first transparent medium layer, and a display screen are used to make a sensing screen, and the antenna layer is arranged right above the display screen, so that a touch area of the sensing screen is fully utilized while screen display is not affected, so as to substantially increase an antenna size and increase an antenna gain. In addition, a first antenna unit transmits a sensing signal, second antenna units receive reflected signals of the sensing signal, and a location corresponding to a touch object is determined according to the reflected signals, so as to implement a sensing function without adding extra costs, thereby reducing costs and achieving use convenience.

Embodiment 4

This embodiment of the present application provides a control circuit of a sensing screen. The control circuit is configured to control the sensing screens corresponding to Embodiment 1 and Embodiment 2. The control circuit 30 includes an adjustment module 40 and a control module 50.

The adjustment module 40 is controlled by the control module 50 to adjust a sensing signal, reflected signals, and a communication signal. The control module 50 is further configured to determine a location of a touch object according to the adjusted sensing signal and reflected signals. The adjustment module 40 is electrically connected to the sensing screen 10 and the control module 50 separately.

In this embodiment, the adjustment module 40 may include an adjustment unit 401, a radio frequency front-end channel 403, a frequency conversion unit 404, and a power division and combination unit 405; and the control module 50 may include a conversion unit 501, a digital signal processing unit 502, and a control unit 503.

Figure 4:
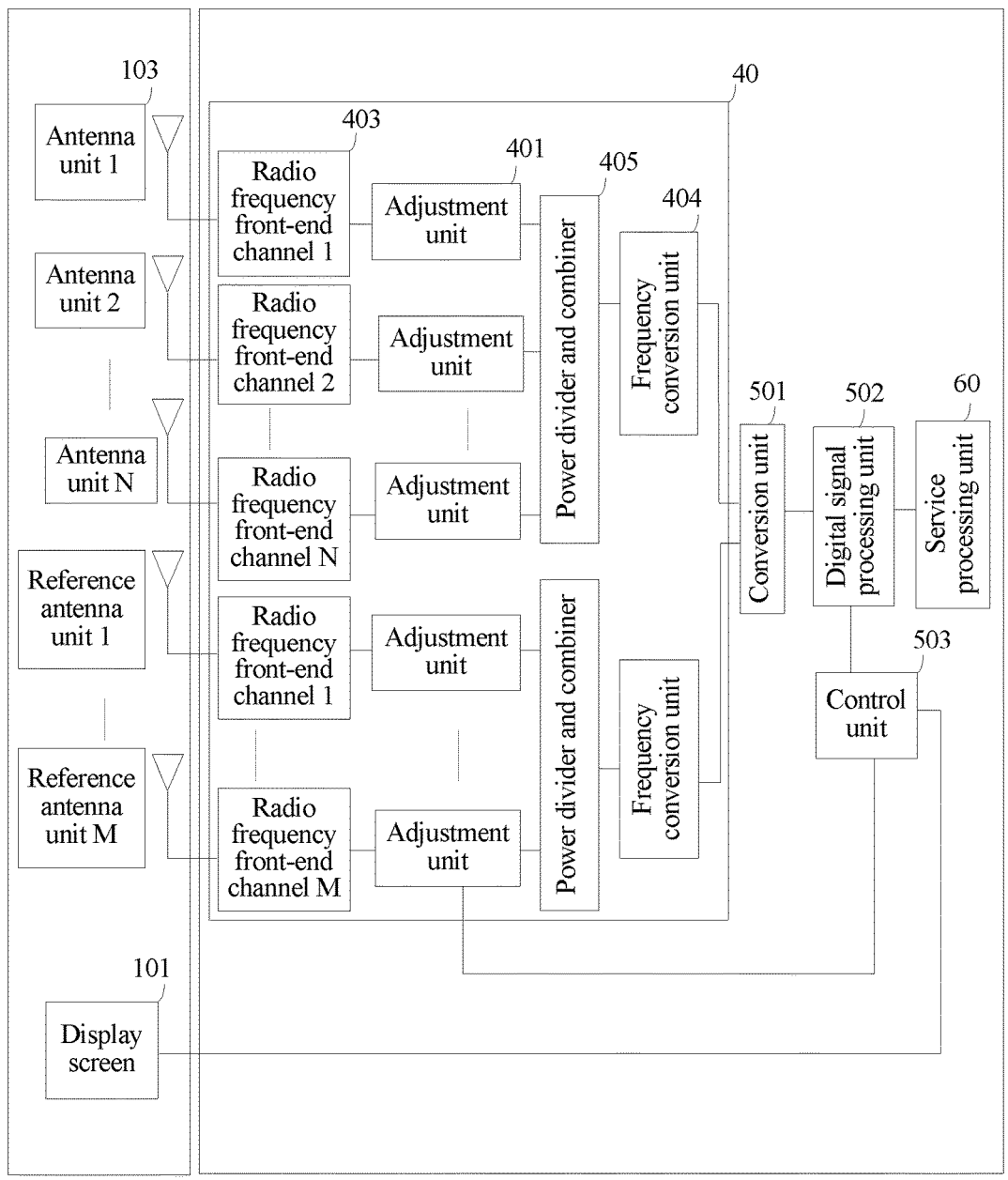
FIG. 4 is a schematic structural diagram of a control circuit according to Embodiment 4 of the present application.

During implementation, referring to FIG. 4, each antenna unit 103 is correspondingly provided with one radio frequency front-end channel 403 and one adjustment unit 401, and multiple antenna units 103 are connected to one frequency conversion unit 404 and one power division and combination unit 405. One control unit 503 controls all adjustment units 401.

In an implementation manner, the radio frequency front-end channel 403, the adjustment unit 401, the power division and combination unit 405, and the frequency conversion unit 404 are sequentially connected between the sensing screen 10 and the control module 50. In this embodiment, description is provided by using this connection manner as an example.

In another implementation manner, the radio frequency front-end channel 403 and the adjustment unit 401, and the frequency conversion unit 404 and the power division and combination unit 405 are sequentially connected between the sensing screen 10 and the control module 50.

In still another implementation manner, the radio frequency front-end channel 403 and the frequency conversion unit 404, and the adjustment unit 401 and the power division and combination unit 405 are sequentially connected between the sensing screen 10 and the control module 50.

In yet another implementation manner, based on the still another implementation manner, a frequency conversion unit 404 is further disposed between the adjustment unit 401 and the power division and combination unit 405.

The control unit 503 is electrically connected to a display screen 101 in the sensing screen and the adjustment unit 401, and the digital signal processing unit 502 is electrically connected to the conversion unit 501 and the control unit 503 separately.

The radio frequency front-end channel 403 is configured to receive the sensing signal, the reflected signals, and the communication signal, and perform standing-wave detection, signal amplification, and filtering on the sensing signal, the reflected signals, and the communication signal. Specifically, referring to FIG. 4b, the radio frequency front-end channel 403 may include a standing-wave detection subunit 4031, a signal amplification subunit 4032, and a filtering subunit 4033.

Figure 4A:
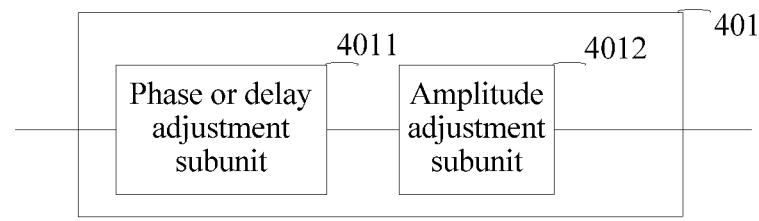
FIG. 4a is a schematic structural diagram of an adjustment unit according to Embodiment 4 of the present application.
Figure 4B:
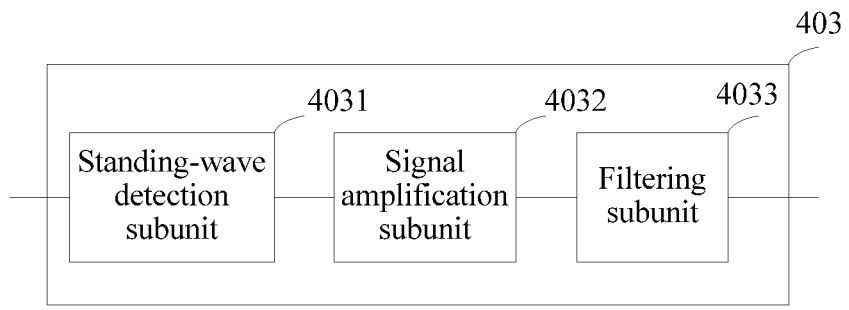
FIG. 4b is a schematic structural diagram of a radio frequency front-end channel according to Embodiment 4 of the present application.

The adjustment unit 401 is configured to adjust amplitude, a phase, or a delay of the sensing signal, the reflected signals, and the communication signal. Referring to FIG. 4a, the adjustment unit 401 may include a phase or delay adjustment subunit 4011 and an amplitude adjustment subunit 4012, so as to adjust the amplitude, the phase, or the delay of the sensing signal, the reflected signals, and the communication signal.

Figure 4C:
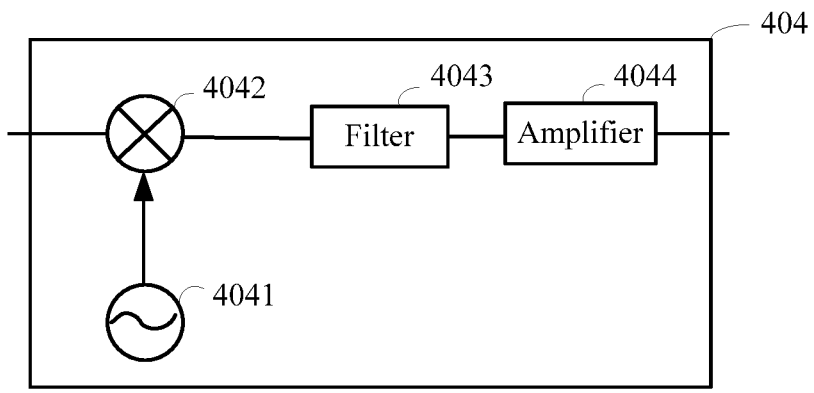
FIG. 4c is a schematic structural diagram of a frequency conversion unit according to Embodiment 4 of the present application.
Figure 5:
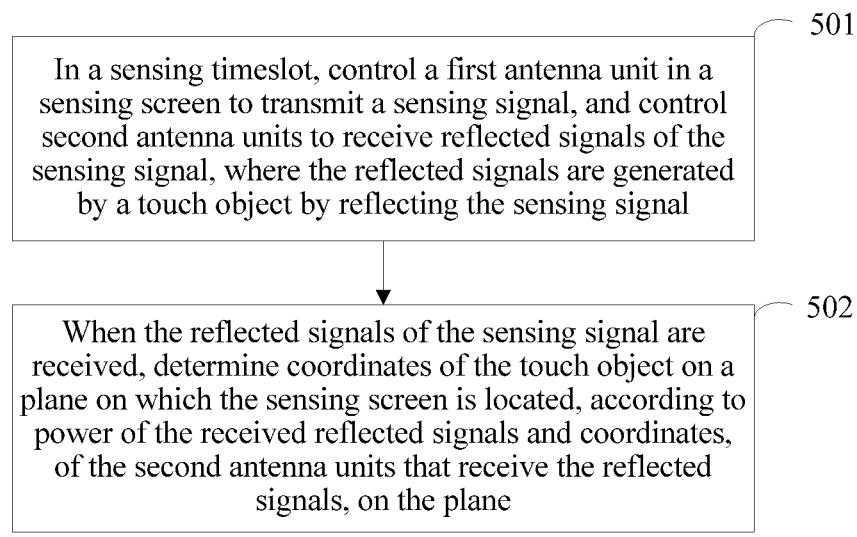
FIG. 5 is a flowchart of a control method according to Embodiment 5 of the present application.

The frequency conversion unit 404 is configured to perform frequency conversion on the sensing signal, the reflected signals, and the communication signal, so as to covert the sensing signal, the reflected signals, and the communication signal between a radio frequency signal, an intermediate frequency signal, and a baseband signal. Referring to FIG. 4c, the frequency conversion unit 404 may include a local oscillator 4041, a mixer 4042, a filter 4043, and an amplifier 4044.

The power division and combination unit 405 is configured to perform power division on the sensing signal, perform power combination on the reflected signals, and perform power combination or power division on the communication signal.

The conversion unit 501 is configured to implement conversion between the sensing signal and a digital signal, between the reflected signals and digital signals, and between the communication signal and a digital signal. The conversion unit 501 includes at least an analog-to-digital conversion subunit and a digital-to-analog conversion subunit.

The digital signal processing unit 502 is configured to perform modulation and demodulation on the communication signal, the sensing signal, and the reflected signals, determine power of the reflected signals, and determine the location of the touch object according to the reflected signals and the power of the reflected signals. It can be easily understood that, the digital signal processing unit 502 includes at least a modulation subunit, a demodulation subunit, and a calculation subunit.

The control unit 503 is configured to control the adjustment unit 401 to perform phase or delay adjustment on a current signal, or control the adjustment unit 401 to perform amplitude adjustment on a current signal.

It should be noted that, the control circuit further includes a service processing unit 60 configured to perform conversion of a communications protocol. The service processing unit 60 is connected to the digital signal processing unit 502.

According to this embodiment of the present application, an antenna layer made of a transparent material, a transparent connection layer, a first transparent medium layer, and a display screen are used to make a sensing screen, and the antenna layer is arranged right above the display screen, so that a touch area of the sensing screen is fully utilized while screen display is not affected, so as to substantially increase an antenna size and increase an antenna gain. In addition, a first antenna unit transmits a sensing signal, second antenna units receive reflected signals of the sensing signal, and a location corresponding to a touch object is determined according to the reflected signals, so as to implement a sensing function without adding extra costs, thereby reducing costs and achieving use convenience.

Embodiment 5

This embodiment of the present application provides a control method of a sensing screen. The method is used to control the sensing screens corresponding to Embodiment 1 and Embodiment 2. The method includes:

Step 501: In a sensing timeslot, control a first antenna unit in a sensing screen to transmit a sensing signal, and control second antenna units to receive reflected signals of the sensing signal, where the reflected signals are generated by a touch object by reflecting the sensing signal.

During implementation, a sensing enabling signal may be generated to trigger an antenna unit to transmit a sensing signal, and to trigger another antenna unit to monitor a reflected signal of the sensing signal. The sensing enabling signal is generated by a system of a terminal to which the sensing screen is applied or the foregoing control circuit, and is used to complete one sensing operation.

In an actual application, the method may further include:

in a communication timeslot, controlling antenna units in the sensing screen to simultaneously transmit or receive a communication signal, where the communication timeslot is used to complete one or more communication operations; one or more sensing timeslots are inserted in one communication timeslot in a spaced manner or are inserted between two adjacent communication timeslots in a spaced manner; during implementation, one or more non-contact sensing operations may be completed in each communication timeslot in a spaced manner, that is, the sensing enabling signal is generated one or more times in each communication timeslot; or one or more non-contact sensing operations may be completed between multiple communication timeslots, that is, the sensing enabling signal is generated one or more times after each communication timeslot.

The touch object includes, but is not limited to, a hand and a stylus.

Step 502: When the reflected signals of the sensing signal are received, determine coordinates of the touch object on a plane on which the sensing screen is located, according to power of the received reflected signals and coordinates, of the second antenna units that receive the reflected signals, on the plane.

According to this embodiment of the present application, an antenna layer made of a transparent material, a transparent connection layer, a first transparent medium layer, and a display screen are used to make a sensing screen, and the antenna layer is arranged right above the display screen, so that a touch area of the sensing screen is fully utilized while screen display is not affected, so as to substantially increase an antenna size and increase an antenna gain. In addition, a first antenna unit transmits a sensing signal, second antenna units receive reflected signals of the sensing signal, and a location corresponding to a touch object is determined according to the reflected signals, so as to implement a sensing function without adding extra costs, thereby reducing costs and achieving use convenience.

Embodiment 6

This embodiment of the present application provides a control method of a sensing screen. The method is used to control the sensing screens corresponding to Embodiment 1 and Embodiment 2. The method includes:

Step 601: Randomly select one antenna unit from multiple antenna units, or select one antenna unit with highest frequency of use from multiple antenna units.

During implementation, statistics of a quantity of times each antenna unit is actually used as a first antenna unit may be collected to collect statistics of frequency of use of each antenna unit.

In this embodiment, the first antenna unit may be switched among the multiple antenna units according to an actual situation. In another implementation manner, one or more fixed antenna units may be used as the first antenna unit or first antenna units. For example, referring to FIG. 1*a*, the seventh and the twelfth antenna units counted from left to right and from top to bottom may be used as the first antenna units.

Before step 601, the method further includes: establishing a spatial Cartesian coordinate system. During implementation, one arbitrary antenna unit may be selected as an origin of the coordinate system, and then the coordinate system is established according to a right-hand rule. It can be easily understood that, a first antenna unit that transmits a sensing signal may also be used as the origin of the coordinate system. In practice, for a case in which each antenna unit acts as the origin, a corresponding coordinate system may be established in advance, so as to correspondingly determine coordinates of other antenna units (that is, second antenna units).

Step 602: In a sensing timeslot, control the selected one antenna unit to transmit a sensing signal.

Step 603: In the sensing timeslot, control second antenna units to receive reflected signals of the sensing signal, where the reflected signals are generated by a touch object by reflecting the sensing signal.

Step 604: Select four reflected signals with highest power from the received reflected signals.

Step 605: Detect whether power of the four selected reflected signals reaches a set threshold.

When the power of the four selected reflected signals reaches the set threshold, step 606 is executed, and when power of one reflected signal among the four selected reflected signals does not reach the set threshold, step 607 is executed.

Step 606: Determine coordinates of the touch object on a plane according to the power of the four selected reflected signals and coordinates of four second antenna units.

As described above, the coordinates of the four second antenna units may be determined by using the first antenna unit as a coordinate origin.

Figure 6:
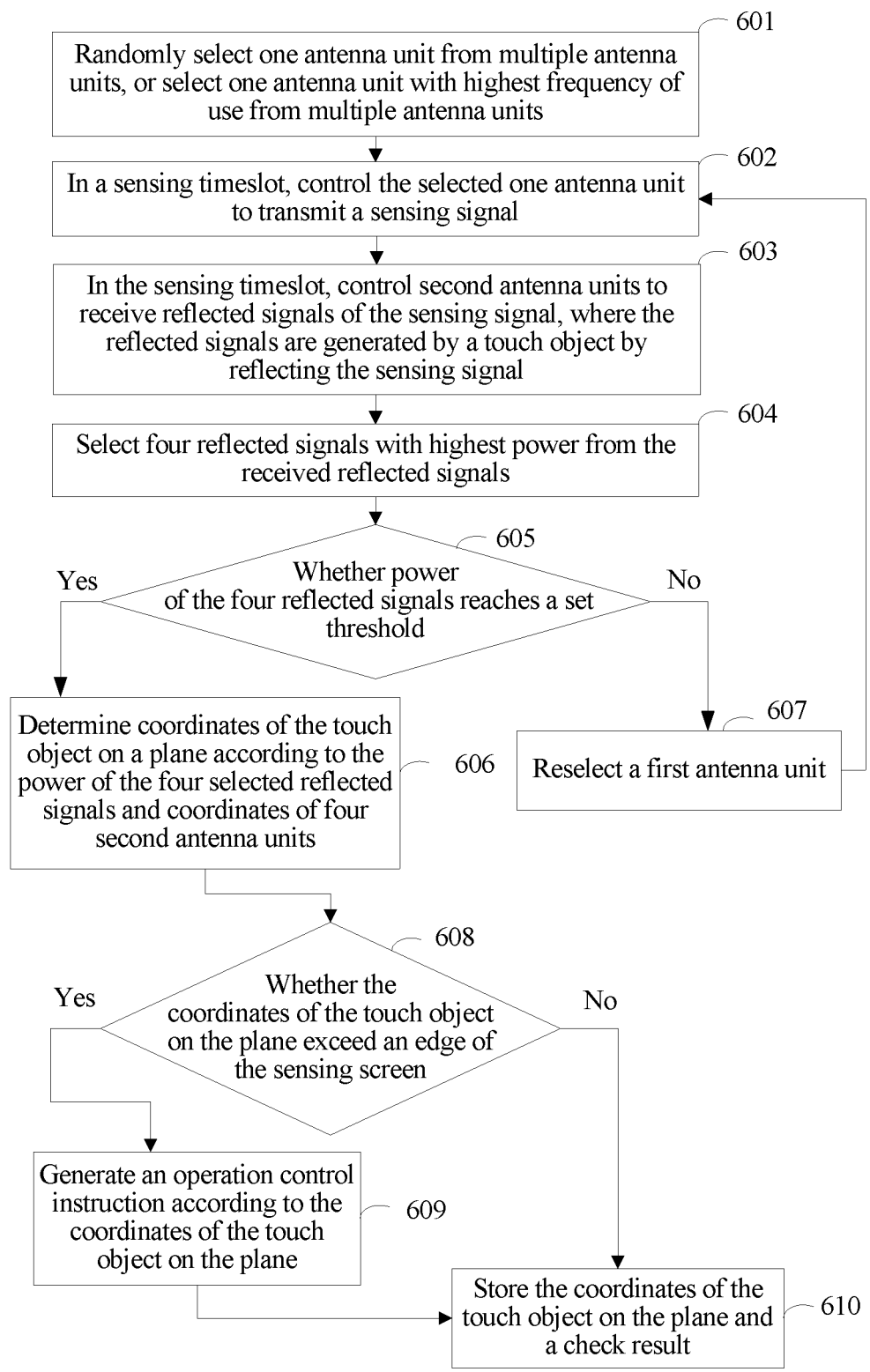
FIG. 6 is a flowchart of a control method according to Embodiment 6 of the present application.
Figure 6A:
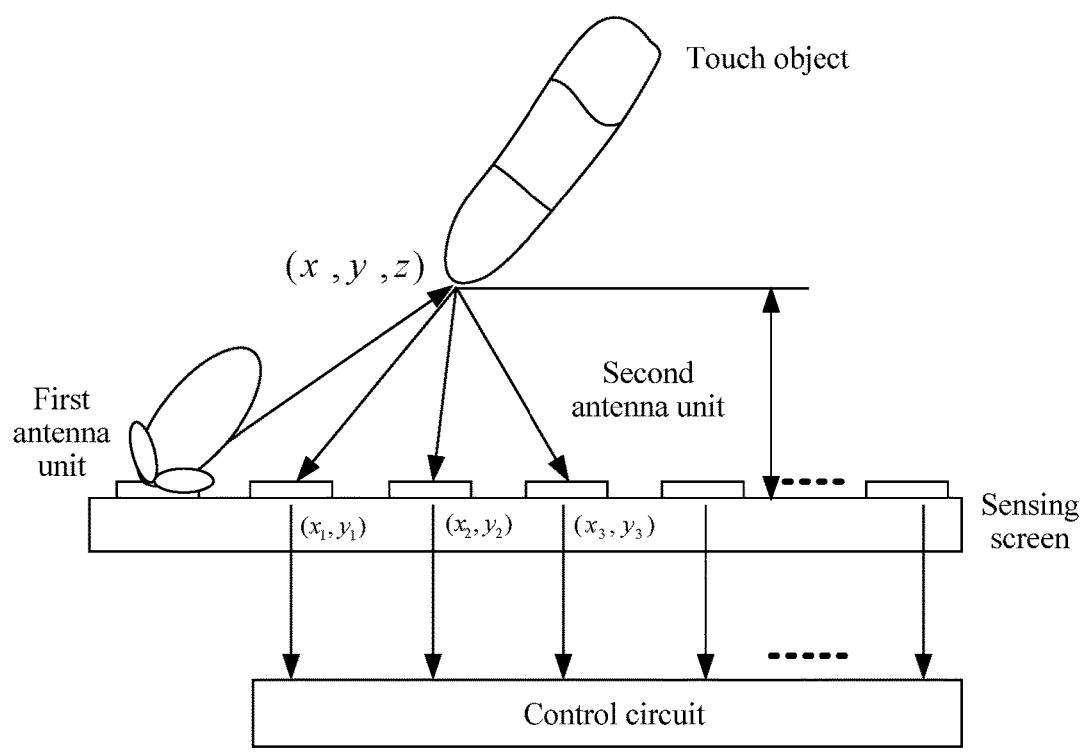
FIG. 6a is a schematic diagram of a locating algorithm of a sensing screen according to Embodiment 6 of the present application.

Referring to FIG. 6*a*, a specific locating algorithm for determining the coordinates of the touch object on the plane according to the coordinates of the four second antenna units with highest power among the reflected signals and the power of the reflected signals is as follows:

The coordinates of the four second antenna units with highest power are represented by $(x_1, y_1) (x_2, y_2) (x_3, y_3)$ and $(x_4, y_4)$, respectively, corresponding power of the four second antenna units with highest power is represented by $P_{r1}$, $P_{r2}$, $P_{r3}$, and $P_{r4}$, respectively, and by obtaining solutions of an equation set formed by equations (1) to (3), the coordinates x and y of the touch object on the plane and a distance z from the touch object to the sensing screen can be obtained.

$$\frac{P_{r1}}{P_{r2}} = \frac{(x-x_2)^2 + (y-y_2)^2 + z^2}{(x-x_1)^2 + (y-y_1)^2 + z^2} \quad (1)$$

$$\frac{P_{r1}}{P_{r3}} = \frac{(x-x_3)^2 + (y-y_3)^2 + z^2}{(x-x_1)^2 + (y-y_1)^2 + z^2} \quad (2)$$

$$\frac{P_{r1}}{P_{r4}} = \frac{(x-x_4)^2 + (y-y_4)^2 + z^2}{(x-x_1)^2 + (y-y_1)^2 + z^2} \quad (3)$$

In another implementation manner, three antenna units with highest power may also be selected in step 604, and correspondingly, calculation shall also be performed in step 605 and step 606 by using the three antenna units with highest power.

Step 607: Reselect a first antenna unit.

During implementation, by scanning and traversing, the antenna units are checked one by one for eligibility as the first antenna unit. After the first antenna unit is reselected, step 602 is returned to, to start execution again.

Step 608: Check whether the coordinates of the touch object on the plane exceed an edge of the sensing screen, to obtain a check result, where when the check result is that the coordinates of the touch object on the plane exceed no edge of the sensing screen, step 609 is executed, and when the check result is that the coordinates of the touch object on the plane exceed an edge of the sensing screen, step 610 is executed.

Step 609: Generate an operation control instruction according to the coordinates of the touch object on the plane.

Step 610: Store the coordinates of the touch object on the plane and the check result of the coordinates of the touch object on the plane.

The check result herein includes that the coordinates of the touch object on the plane exceed an edge of the sensing screen and that the coordinates of the touch object on the plane exceed no edge of the sensing screen.

The coordinates of the touch object on the plane are stored, and when the coordinates of the touch object on the plane exceed no edge of the sensing screen, quantities of times of use of the second antenna units are increased by one. The frequency of use of each antenna unit is determined according to a quantity of times of use of each antenna unit, so as to provide a basis for selecting a first antenna unit next time.

It should be noted that, after the sensing screen is used for a certain period of time, for example, one month or three months, the stored coordinates of the touch object on the plane may further provide reference information for a next check. For example, a register or the like may be used to store effective coordinates of the touch object on the plane (that is, coordinates of the touch object on the plane that exceed no edge of the sensing screen) together, and when coordinates of a current touch object on a plane are calculated, that is, in step 608, the coordinates of the current touch object on the plane may be directly matched with those in the register, so as to improve sensing speed and reliability.

It can be easily understood that, the coordinates of the touch object on the plane when the coordinates of the touch object on the plane exceed an edge of the sensing screen are stored, so that determining can be performed more rapidly when a first antenna unit is selected next time or at a next check, and therefore the sensing speed and reliability can also be improved. During implementation, when the coordinates of the touch object on the plane exceed an edge of the sensing screen, a quantity of sensing errors may further be recorded, and when a value of a counter reaches a set value, an error warning is sent.

In this embodiment, the method may further include:

according to the coordinates of the touch object on the plane and the distance from the touch object to the sensing screen, controlling a beam angle generated by the antenna units in a communication timeslot, where the touch object is located outside the generated beam angle.

The distance from the touch object to the sensing screen may be calculated in the following manner:

If the four antenna units with highest power are used in step 604, the distance from the touch object to the sensing screen may be directly obtained according to the equations (1) to (3) in step 606.

If the three antenna units with highest power are used in step 604, the distance from the touch object to the sensing screen may be obtained according to time differences between transmitting of the sensing signal and receiving of the reflected signals, propagation speed of the sensing signal and the reflected signals, and distances between the first antenna unit that transmits the sensing signal and the second antenna units that receive the reflected signals.

In this embodiment, the touch object is located outside the generated beam angle, that is, no usable beam exists in an area in which the touch object is located, so as to effectively prevent the touch object that is too close to the sensing screen or that is in direct contact with the sensing screen from blocking a signal of an antenna unit.

When the touch object is too close to the sensing screen, reflection performed by the antenna units may be caused, so that radiation performance of the antenna units is uncontrolled, and it is difficult to ensure radiation safety of the antenna units. That the touch object is located outside the generated beam angle can effectively prevent a blocking object that is too close to the sensing screen, that is, a non-contact touch object from affecting sensitivity of the antenna units.

In this embodiment, the method may further include:

separately detecting whether strength of a reflected signal received by each antenna unit reaches a set threshold; and closing a communication channel of an antenna unit corresponding to a reflected signal that reaches the threshold.

This step may be performed before step 604. The strength of the reflected signal may be power, amplitude, or the like of the reflected signal. During implementation, a standing-wave detector may be used to detect the strength of the reflected signal.

Communication channels of the antenna units are usually planned according to a quantity of antenna units and the like during system design. One communication channel may be corresponding to one antenna unit, or one communication channel may be corresponding to multiple antenna units. If one communication channel is corresponding to multiple antenna units, if strength of a reflected signal received by one antenna unit of the multiple antenna units exceeds the set threshold, but no strength of reflected signals received by the other antenna units of the multiple antenna units exceeds the set threshold, the corresponding communication channel also needs to be closed in the communication timeslot. However, in a next communication timeslot, a closed communication channel is automatically opened, so that the antenna units use the communication channel normally.

During implementation, after a corresponding communication channel of an antenna unit is closed, warning information may further be sent. The warning information is used to inform a user that the touch object or the blocking object is too close to the sensing screen. The warning information may be displayed on a display screen, so as to prompt the user to avoid the problem, thereby improving radiation protection of the antenna units in the sensing screen.

According to this embodiment of the present application, an antenna layer made of a transparent material, a transparent connection layer, a first transparent medium layer, and a display screen are used to make a sensing screen, and the antenna layer is arranged right above the display screen, so that a touch area of the sensing screen is fully utilized while screen display is not affected, so as to substantially increase an antenna size and increase an antenna gain. In addition, a first antenna unit transmits a sensing signal, second antenna units receive reflected signals of the sensing signal, and a location corresponding to a touch object is determined according to the reflected signals, so as to implement a sensing function without adding extra costs, thereby reducing costs and achieving use convenience.

Embodiment 7

Figure 7:
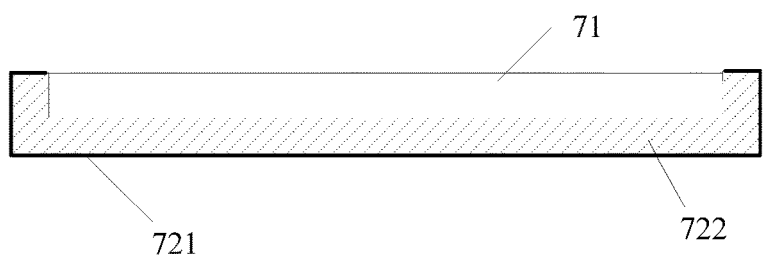
FIG. 7 is a schematic structural diagram of a sensing screen apparatus according to Embodiment 7 of the present application.

This embodiment of the present application provides a sensing screen apparatus. Referring to FIG. 7, the apparatus includes a sensing screen 71 corresponding to Embodiment 1 and Embodiment 2 and a control apparatus 72. The control apparatus 72 includes a housing 721 and a control circuit 722 that is corresponding to Embodiment 3 and Embodiment 4. The control circuit 722 is disposed in the housing 721. The control circuit 722 is connected to the sensing screen 71 by using the housing 721.

Figure 7A:
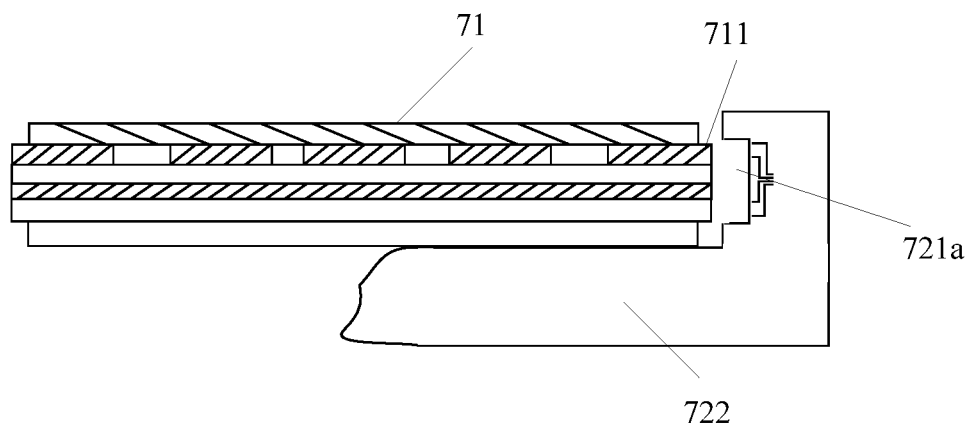
FIG. 7a is another schematic structural diagram of a sensing screen apparatus according to Embodiment 7 of the present invention.
Figure 7B:
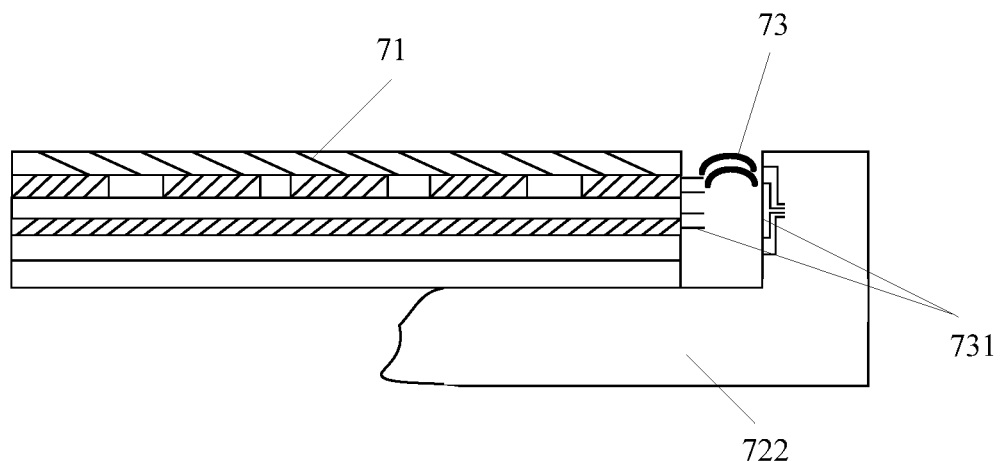
FIG. 7b is another schematic structural diagram of a sensing screen apparatus according to Embodiment 7 of the present invention.
Figure 7C:
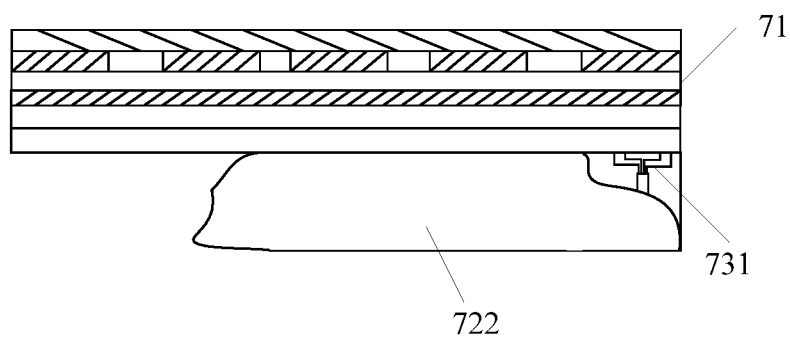
FIG. 7c is another schematic structural diagram of a sensing screen apparatus according to Embodiment 7 of the present invention.

During implementation, the sensing screen 71 may be connected to the control circuit 722 by using a jumper, or a connector, or a slot 721a disposed on the housing 721. In a manner in which the sensing screen 71 is connected to the control circuit 722 by using the slot 721a disposed on the housing 721, referring to FIG. 7a, a side surface of the sensing screen 71 is provided with an extended protrusion 711, where the extended protrusion 711 is a conductor, and the conductor may be mounted in the slot 721a. In a manner in which the sensing screen 71 is connected to the control circuit 722 by using a jumper 73 or the connector (not shown in the figure), referring to FIG. 7b and FIG. 7c, a connecting line 731 is further connected on the sensing screen 71 and the control circuit 722. Preferably, the sensing screen 71 is connected to the control circuit 722 by using the slot 721a disposed on the housing 721, and this implementation manner is relatively simple, and facilitates overall integration of the sensing screen and the control circuit.

According to this embodiment of the present application, an antenna layer made of a transparent material, a transparent connection layer, a first transparent medium layer, and a display screen are used to make a sensing screen, and the antenna layer is arranged right above the display screen, so that a touch area of the sensing screen is fully utilized while screen display is not affected, so as to substantially increase an antenna size and increase an antenna gain. In addition, a first antenna unit transmits a sensing signal, second antenna units receive reflected signals of the sensing signal, and a location corresponding to a touch object is determined according to the reflected signals, so as to implement a sensing function without adding extra costs, thereby reducing costs and achieving use convenience.

It should be noted that, in the sensing screen apparatus provided by the foregoing embodiment, control of the sensing screen is described only by way of example of division of the foregoing functional modules, and in an actual application, the foregoing functions may be assigned according to needs to different functional modules for implementation, that is, the internal structure of the apparatus is divided into different functional modules, so as to implement all or a part of the functions described above. In addition, the sensing screen apparatus provided by the foregoing embodiment is based on the same concept as the embodiment of the control method of the sensing screen, and details of the specific implementation process of the sensing screen apparatus may be referred to the method embodiment, and are not repeated herein.

The sequence numbers of the foregoing embodiments of the present application are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely exemplary embodiments of the present application, but are not intended to limit the present application. Any modification, equivalent replacement, and improvement made without departing from the spirit and principle of the present application shall fall within the protection scope of the present application.

What is claimed is:

1. A sensing screen, comprising:
a display screen;
a first transparent medium layer;
a second transparent medium layer;
a connection layer, wherein the connection layer is transparent; and
an antenna layer, wherein the antenna layer is transparent;
wherein the first transparent medium layer is sandwiched between the connection layer and the antenna layer, the connection layer is sandwiched between the first transparent medium layer and the second transparent medium layer, and the second transparent medium layer is sandwiched between the connection layer and the display screen, wherein the antenna layer, the first transparent medium layer, the connection layer, and the second transparent medium layer are all arranged right above the display screen,
wherein the antenna layer comprises multiple antenna units each having an antenna, and the multiple antenna units comprise at least one first antenna unit and multiple second antenna units, wherein the multiple second antenna units are interspersed with the first antenna unit,
wherein the at least one first antenna unit is configured to transmit a sensing signal in a sensing timeslot and the multiple second antenna units are configured to receive reflected signals of the sensing signal that are generated by a touch object by reflecting the sensing signal in the sensing timeslot, wherein the sensing timeslot is used to complete a sensing operation,
wherein the at least one first antenna unit and the multiple second antenna units are configured to simultaneously transmit a first communication signal in a communication timeslot and the at least one first antenna unit and the multiple second antenna units are configured to simultaneously receive a second communication signal in the communication timeslot, wherein the communication timeslot is used to complete a non-contact sensing operation,
wherein one or more sensing timeslots are inserted in one communication timeslot in a spaced manner or are inserted between two adjacent communication timeslots in a spaced manner, and the at least one first antenna unit is selected from among the multiple antenna units to transmit the sensing signal in at least one of the one or more sensing timeslots based on one of a highest frequency of use and a power of reflected signals received by the multiple second antenna units, and
wherein the second transparent medium layer comprises transparent glass or air.

2. The sensing screen according to claim 1, wherein the antenna layer comprises multiple antenna feeders configured to feed the multiple antenna units, wherein each antenna feeder is respectively connected to a different antenna.

3. The sensing screen according to claim 1, wherein a radiation direction of a first antenna array formed by a first set of antenna units is parallel with the display screen, and a radiation direction of a second antenna array formed by a second set of antenna units is perpendicular to the display screen.

4. The sensing screen according to claim 3, wherein the antennas are made of one or more of indium tin oxide, fluorine-doped tin oxide, aluminum-doped zinc oxide, and indium-doped zinc oxide.

5. The sensing screen according to claim 3, wherein the antennas are low-profile antennas, and the low-profile antennas comprise one or more of a patch antenna, a slot antenna, and a Vivaldi antenna.

6. The sensing screen according to claim 1, wherein the connection layer comprises a shield layer and a ground layer, wherein
the shield layer is configured to shield the antenna layer and return the first communication signal, the sensing signal, and the reflected signals, and
the ground layer is configured to ground the antenna layer.

7. The sensing screen according to claim 1, wherein the sensing screen further comprises
a transparent protective layer that overlies the antenna layer, and the transparent protective layer and the first transparent medium layer are located on two sides of the antenna layer.

8. The sensing screen according to claim 1, wherein the antenna layer comprises multiple antenna feeders configured to feed the multiple antenna units, wherein each antenna feeder is connected to multiple antennas.

9. A control apparatus configured to control a sensing screen, the control apparatus comprising:
an adjustment circuit; and
a control circuit;
wherein the sensing screen comprises a display screen, a first transparent medium layer, a second transparent medium layer, a connection layer, and an antenna layer;
wherein both the connection layer and the antenna layer are transparent;
wherein the first transparent medium layer is sandwiched between the connection layer and the antenna layer, the connection layer is sandwiched between the first transparent medium layer and the second transparent medium layer, and the second transparent medium layer is sandwiched between the connection layer and the display screen, wherein the antenna layer, the first transparent medium layer, the connection layer, and the second transparent medium layer are all arranged right above the display screen;
wherein the antenna layer comprises multiple antenna units each having an antenna, and the multiple antenna units comprise at least one first antenna unit and multiple second antenna units, wherein the multiple second antenna units are interspersed with the first antenna unit;
wherein the at least one first antenna unit is configured to transmit a sensing signal in a sensing timeslot and the multiple second antenna units are configured to receive reflected signals of the sensing signal that are generated by a touch object by reflecting the sensing signal in the sensing timeslot, wherein the sensing timeslot is used to complete a sensing operation;
wherein the at least one first antenna unit and the multiple second antenna units are configured to simultaneously transmit a first communication signal in a communication timeslot and the at least one first antenna unit and the multiple second antenna units are configured to simultaneously receive a second communication signal in the communication timeslot, wherein the communication timeslot is used to complete a non-contact sensing operation,
wherein one or more sensing timeslots are inserted in one communication timeslot in a spaced manner or are inserted between two adjacent communication timeslots in a spaced manner, and the at least one first antenna unit is selected from among the multiple antenna units to transmit the sensing signal in at least one of the one or more sensing timeslots based on one of a highest frequency of use and a power of reflected signals received by the multiple second antenna units;
wherein the second transparent medium layer comprises transparent glass or air;
wherein the adjustment circuit is controlled by the control circuit to adjust the sensing signal, the reflected signals, and the first communication signal;
wherein the control circuit is further configured to determine a location of a touch object according to the adjusted sensing signal and reflected signals; and
wherein the adjustment circuit is electrically connected to the sensing screen and the control circuit separately.

10. The control apparatus according to claim 9, wherein the adjustment circuit comprises:
a radio frequency front-end channel, configured to receive the sensing signal, the reflected signals, and the first communication signal, and perform standing-wave detection, signal amplification, and filtering on the sensing signal, the reflected signals, and the first communication signal;
an adjustment unit, configured to adjust amplitude, a phase, or a delay of the sensing signal, the reflected signals, and the first communication signal;
a frequency conversion unit, configured to perform frequency conversion on the sensing signal, the reflected signals, and the first communication signal; and
a power division and combination unit, configured to perform power division on the sensing signal, perform power combination on the reflected signals, and perform power combination or power division on the first communication signal.

11. The control apparatus according to claim 10, wherein the radio frequency front-end channel, the adjustment unit, the power division and combination unit, and the frequency conversion unit are sequentially connected between the sensing screen and the control circuit.

12. The control apparatus according to claim 10, wherein the radio frequency front-end channel, the adjustment unit, the frequency conversion unit, and the power division and combination unit are sequentially connected between the sensing screen and the control circuit.

13. The control apparatus according to claim 10, wherein the radio frequency front-end channel, the frequency conversion unit, the adjustment unit, and the power division and combination unit are sequentially connected between the sensing screen and the control circuit.

14. A sensing screen apparatus, comprising:
a sensing screen, comprising: a display screen, a first transparent medium layer, a second transparent medium layer, a connection layer, and an antenna layer, wherein both the connection layer and the antenna layer are transparent; and
a control apparatus, comprising: a housing and a control circuit, wherein the control circuit is disposed in the housing, and the control circuit is operably coupled to the sensing screen;
wherein the first transparent medium layer is sandwiched between the connection layer and the antenna layer, the connection layer is sandwiched between the first transparent medium layer and the second transparent medium layer, and the second transparent medium layer is sandwiched between the connection layer and the display screen, wherein the antenna layer, the first transparent medium layer, the connection layer, and the second transparent medium layer are all arranged right above the display screen;

wherein the antenna layer comprises multiple antenna units each having an antenna, and the multiple antenna units comprise at least one first antenna unit and multiple second antenna units, wherein the multiple second antenna units are interspersed with the first antenna unit;

wherein the at least one first antenna unit is configured to transmit a sensing signal in a sensing timeslot and the multiple second antenna units are configured to receive reflected signals of the sensing signal that are generated by a touch object by reflecting the sensing signal in the sensing timeslot, wherein the sensing timeslot is used to complete a sensing operation;

wherein the at least one first antenna unit and the multiple second antenna units are configured to simultaneously transmit a first communication signal in a communication timeslot and the at least one first antenna unit and the multiple second antenna units are configured to simultaneously receive a second communication signal in the communication timeslot, wherein the communication timeslot is used to complete a non-contact sensing operation;

wherein one or more sensing timeslots are inserted in one communication timeslot in a spaced manner or are inserted between two adjacent communication timeslots in a spaced manner, and the at least one first antenna unit is selected from among the multiple antenna units to transmit the sensing signal in at least one of the one or more sensing timeslots based on one of a highest frequency of use and a power of reflected signals received by the multiple second antenna units; and wherein the second transparent medium layer comprises transparent glass or air.

15. The sensing screen apparatus according to claim 14, wherein the sensing screen is connected to the control circuit by using a jumper, or a connector, or a slot disposed on the housing.

* * * * *